COPLANAR THIN MAGNETIC FILM SHIFT REGISTER

Filed Oct. 5, 1961 5 Sheets-Sheet 1

INVENTORS
WALTER GHISLER
SIMON MIDDELHOEK

BY S. P. Tedesco

ATTORNEY

June 22, 1965 W. GHISLER ETAL 3,191,054

COPLANAR THIN MAGNETIC FILM SHIFT REGISTER

Filed Oct. 5, 1961 5 Sheets-Sheet 3

COPLANAR THIN MAGNETIC FILM SHIFT REGISTER 3,191,054

COPLANAR THIN MAGNETIC FILM SHIFT REGISTER

Walter Ghisler, Upplands Vasby, Sweden, and Simon Middelhoek, Kilchberg, Zurich, Switzerland, assignors to International Business Machines Corporation, New York, N.Y., a corporation of New York Filed Oct. 5, 1961, Ser. No. 143,103
Claims priority, application Switzerland, Dec. 29, 1960, 14,564/60
15 Claims. (Cl. 307—88)

Figure 1:
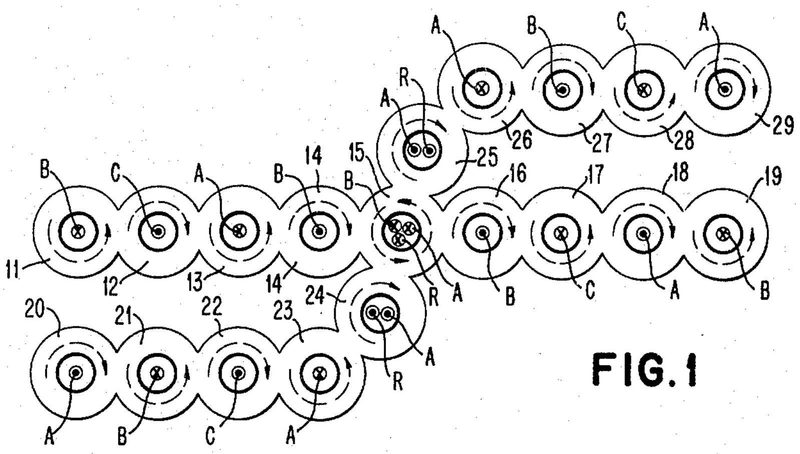

This invention relates to a coplanar thin magnetic film arrangement consisting of thin magnetic film cells which are associated one with the other and are arranged in rows; with these thin magnetic film cells the transmission of binary information takes place by means of wall motion, i.e. by the propagation of domain walls which separate spheres of different directions of magnetization. The invention is employed preferably for the realization of complex switching arrangements in electronic computers and data processing machines.

Thin magnetic film arrangements are known which, by applying the principle of wall motion effect the transport of binary information in the manner of a shift register and the logical connection of binary information. When designing computers and control circuits one is faced with the problem of connecting the available basic circuits as, for example, shift registers, logical connection circuits for conjunction, disjunction, negation, etc., to larger complex logical switching units as, for example, adders. In complex switching arrangements wherein groups of thin magnetic film cells are arranged in rows and lie in a single plane, it is obviously necessary to effect coplanar crossing of binary information transferred along each such group. An extensive application of thin magnetic film arrangements was opposed until recently as it was not known how such coplanar crossings could be effected without causing mutually disturbing influence among such groups.

Accordingly, it is an object of this invention to provide a coplanar thin magnetic film arrangement which permits binary information to be transported undisturbed across a coplanar crossing.

Various embodiments of this invention will be described here, where the transport of information across the coplanar crossings takes place in a three or four clock mode of operation.

A further object of this invention is to provide coplanar thin magnetic film arrangements with circular uniaxial thin magnetic film cells as well as with linear uniaxial thin magnetic film cells.

The coplanar thin magnetic film arrangement in accordance with one aspect of this invention comprises groups of continuously connected thin magnetic film cells arranged in coplanar rows and pervious to domain walls separating magnetically differently aligned spheres of magnetization. The groups of thin magnetic film cells are associated with various clock groups of magnetic driving fields. The cells of each clock group are subjected to a same shifting and resetting clock program so as to transfer the direction of magnetization of particular cells and advance the domain walls, i.e. the binary information, therealong. At a point where rows of cells intersect, a portion of the thin magnetic film common to all rows effects a coplanar crossing of the binary information without mutual disturbance. The binary information is transferred along each of the rows and into the common or center thin magnetic film cell along first thin magnetic film cells (input elements), respectively, and directed from the center cell along second thin magnetic film cells (output elements), respectively. The respective input and output elements are operatively incorporated as part of a same row and belong to the same clock group whereas the center cell belongs to all clock groups.

The foregoing and other objects, features and advantages of the invention will be apparent from the following more particular description of preferred embodiments of the invention, as illustrated in the accompanying drawings.

Figure 2:
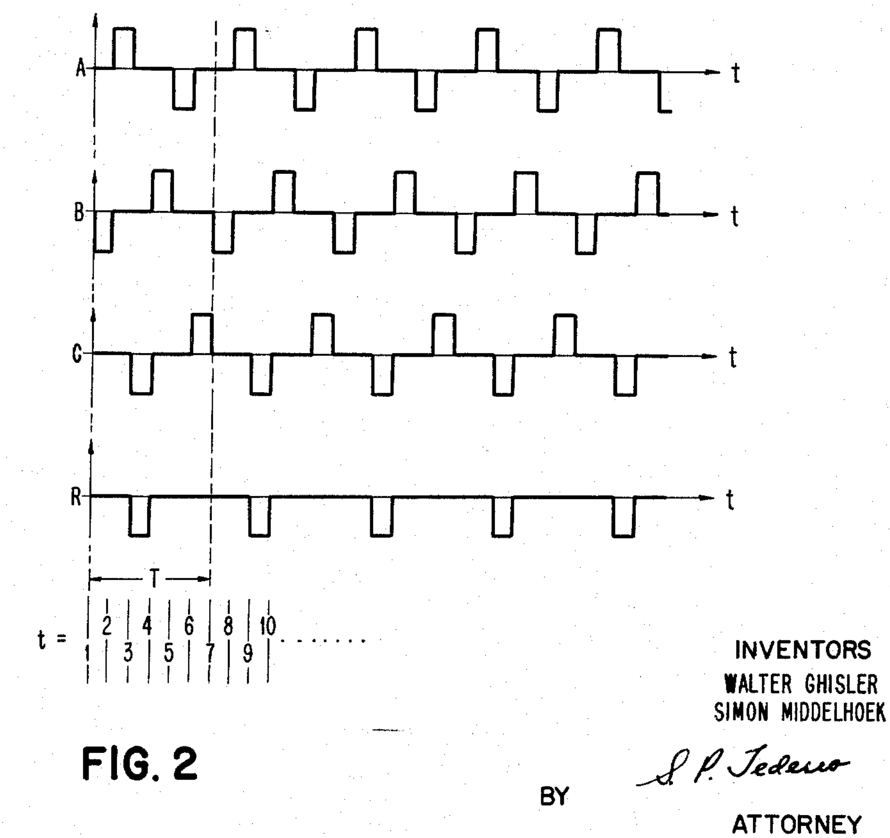
Figures 3A, 3B, 3C, 3D, 3E, 3F:
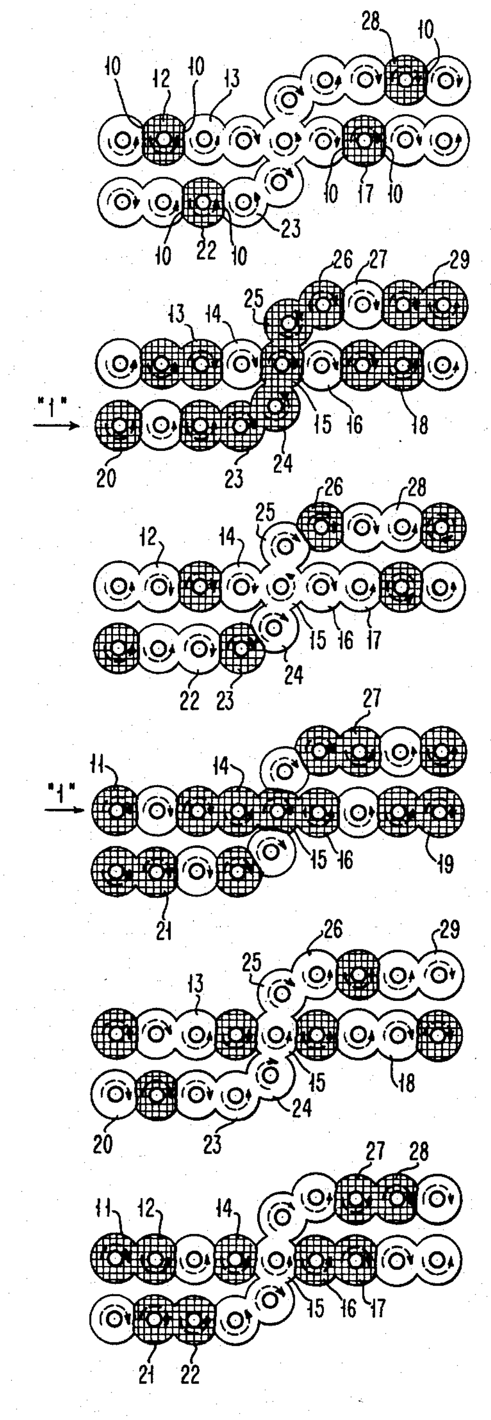
Figure 4:
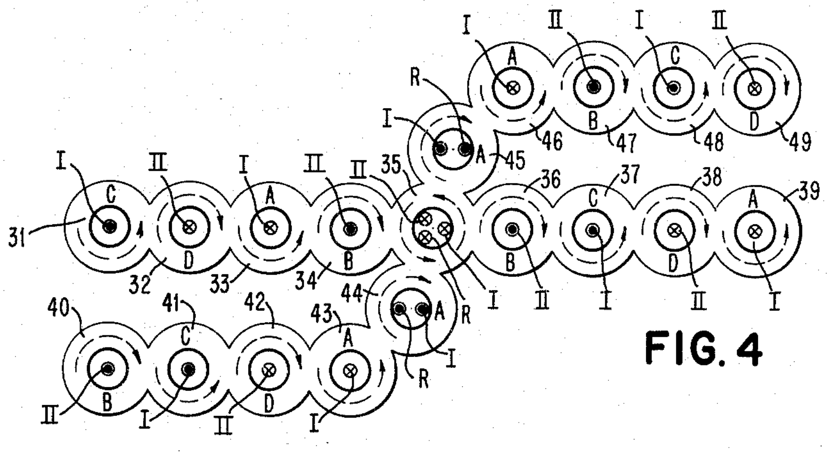
Figure 5:
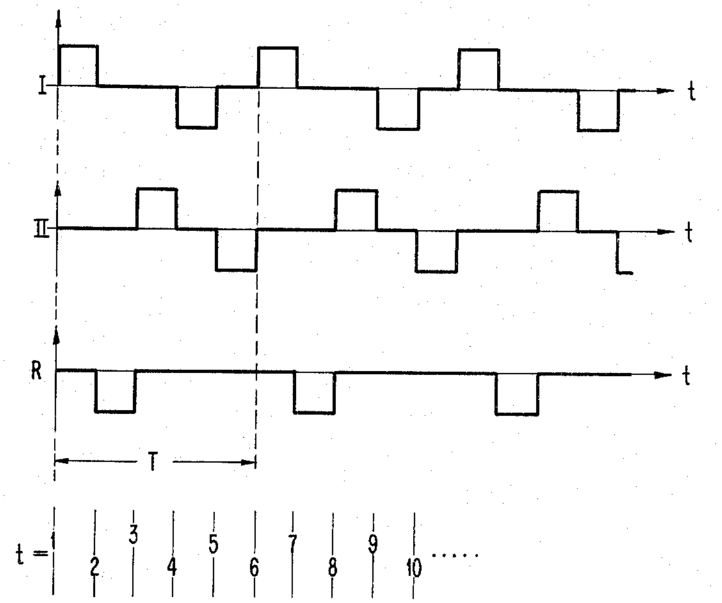

In the drawings:

FIG. 1 shows a coplanar thin magnetic film arrangement with ring shaped thin magnetic film cells, operated in a three clock system, FIG. 2 shows the pulse programs for operating the thin magnetic film arrangement of FIG. 1, FIGS. 3*a* to 3*f* diagrammatically illustrates the transfer of information in the thin magnetic film arrangement of FIG. 1, FIG. 4 shows a coplanar thin magnetic film arrangement with ring shaped thin magnetic film cells, operated in a four clock system, FIG. 5 shows the pulse programs for operating the thin magnetic film arrangement of FIG. 4, FIG. 6*a* to 6*e* diagrammatically illustrate the transfer of information of the thin magnetic film arrangement of FIG. 4, FIGS. 7*a* to 7*c* show a coplanar thin magnetic film arrangement operated in a four clock system, with two crossing thin magnetic film strips, the thin magnetic film cells of which have a linear uniaxial anisotrophy.

FIG. 1 shows an embodiment, in accordance with the invention, of the coplanar thin magnetic film arrangement with ring shaped, continuously connected thin magnetic film cells which have a circular uniaxial anisotrophy. The coplanar thin magnetic film arrangement of FIG. 1 employes a three-clock independent mode of operation and enables the independent transfer of binary information over a coplanar crossing without disturbance along two shift registers of binary information which are independent of each other. The first shift register comprises the thin magnetic film cells 11 to 19 and the second shift register comprises the cells 20 to 29, center element 15 is operatively incorporated as part of both shift registers. Neighboring thin magnetic film cells are continuously connected by a predetermined marginal section of their circumference in such a manner that domain walls separating differently aligned spheres of magnetization can be switched from one cell to the next by magnetic driving fields generated by driving conductors passing concentrically through the cells. The field strength of the magnetic driving fields is smaller than the nucleation field strength $H_N$ and larger than the critical field strength $H_C$ for wall motion in the layer. The initial magnetization of the neighboring cells, which characterize a certain information (e.g. "0"), is such that in two neighboring cells the magnetization of the one at any given time is directed in a clockwise direction and the magnetization of the other in a counterclockwise direction. In the initial or "0"-position there are no domain walls between neighboring cells. The direction of magnitization in the individual cells is represented diagrammatically in FIG. 1 by the dotted arrows. The magnetic driving fields are generated by three driving conductors A, B, C which traverse the thin magnetic film cells allotted to them in a meandering manner, i.e. alternately from top to bottom and from bottom to top. The cells 13, 18, 20, 23, 24, 15, 25, 26, and 29 are allotted to the driving conductor A, the cells 11, 14, 15, 16, 19, 21, and 27 are allotted to the driving conductor B and the cells 12, 17, 22, and 28 are allotted to the driving conductor C. It will be seen that the center element 15 is associated with the driving conductor A as well as with the driving conductor B but not with the driving conductor C. All other cells are associated with only one driving conductor.

The clock program, hereafter described, effects a transfer of information along the shift registers from left to right. The binary information transferred in the first shift register is fed to the center element 15 on the input side via cell 14 and taken away on the output side via cell 16. The binary information transferred in the second shift register is fed to the center element 15 on the input side via cell 24 and taken away on the output side via cell 25. Of the four cells neighboring the center element 15, the cells 14 and 24 are preferably referred to as the input elements and the cells 16 and 25 as the output elements. Apart from the previously mentioned driving conductors, the coplanar thin magnetic film cell arrangement according to the invention also comprises a reset conductor R which is associated with the center element 15 and the neighboring input and output elements 24 and 25 which belong to the same shift register. The thin magnetic film cell arrangement applied in FIG. 1 is compatible with the meandering transition of the cells by the reset and driving conductors, i.e. in every case the next cell allotted to the common conductor is traversed in the opposite direction. In order to comply with this requirement the cell 23 is provided in particular; if this cell were dispensed with, it would be necessary to lead back from bottom to top or vice versa one or possibly several driving conductors outside the actual configuration of thin magnetic film cells.

The A-cells 13, 23, 15, and 26 are traversed by the driving conductor A from top to bottom (symbolic sign⊗), the A-cells 18, 20, 24, 25, and 29, however, are traversed from bottom to top (symbolic sign⊙). Thus a positive pulse in driving conductor A generates and applies a magnetic driving field in a clockwise direction with respect to the cells 13, 23, 15 and 26, but a magnetic driving field in a counterclockwise direction with respect to the cells 18, 20, 24, 25, and 29. Therefore, and in accordance with the foregoing definition of the initial or "0"-position, a positive pulse in driving line A endeavours to switch the magnetization of the A-cells as shown in FIG. 1 and into the "1"-position, but only succeeds if domain walls are present in the marginal zones of these cells towards the neighboring cells. It is advantageous to designate those pulses which endeavour to switch a cell into the "1"-position as shift pulses and those which bring about a reset of a cell to the initial or "0"-position as reset pulses. The driving conductors B and C are also woven through the cells allotted to them, in the same meandering manner as the driving conductor A. In particular: The driving conductor B traverses the B-cells 11, 15, 19, and 21 from top to bottom (symbolic sign⊗), the B-cells 14, 16, and 27, on the other hand, from bottom to top (symbolic sign⊙). A positive pulse in driving conductor B acts on all B-cells as a shift pulse, a negative pulse acts as a reset pulse. The driving conductor C is woven through the C-cells 17 and 28 from top to bottom (symbolic sign⊗), but through the C-cells 12 and 22 from bottom to top (symbolic sign⊙). A positive pulse in the driving conductor C acts on all the C-cells as a shift pulse, a negative pulse acts as ar reset pulse.

The reset conductor R traverses the input element 24 from bottom to top, and the neighboring center element 15 from top to bottom and the output element 25 (connected on the output side) from bottom to top again. This conductor arrangement is indicated in FIG. 1, making use of the symbolic signs ⊙ or ⊗ in order to comply with the above definition. A negative pulse in the reset conductor R acts on the associated C-cells 24 and 25 and center cell 15 as a reset pulse.

For operating the coplanar thin magnetic film cell arrangement for the transport of binary information without disturbance over a crossing the three-clock pulse program illustrated in FIG. 2 is employed. At the clock times $t=2$, 8, 14, 20, 26, etc. the driving conductor A receives positive current pulses and at the clock times $t=5$, 11, 17, 23, 29, etc. negative current pulses. At the clock times $t=4$, 10, 16, 22, 28, etc. the driving conductor B receives positive current pulses and at the clock times $t=1$, 7, 13, 19, 25, etc. negative current pulses. At the clock times $t=6$, 12, 18, 24, etc. the driving conductor C receives positive current pulses and at the clock times $t=3$, 9, 15, 21, 27, negative current pulses. The reset conductor R receives negative current pulses synchronously with the C-reset pulses, i.e. synchronous with the reset pulses on that driving conductor to which the center element 15 is not allotted. In a practical embodiment it is necessary to visualize the driving conductors A, B, C and also the reset conductor R connected to a clock pulse generator, not shown in FIG. 1, which supplies the positive and negative current pulses in accordance with the clock program illustrated in FIG. 2. The current pulses are repeated periodically after six clock times; the clock period is T.

In order to explain the progress of an undisturbed transport of binary information over the crossing of the two shift registers in a three-clock mode of operation, the magnetization condition of the cells in the coplanar thin magnetic film arrangement according to FIG. 1 is illustrated diagrammatically in FIGS. 3*a* to 3*f* at six different instants.

It is assumed in FIG. 3*a* that the binary information "1" is present in all the C-cells of the thin magnetic film arrangement. In the drawing, those thin magnetic film cells which are in the "1"-position are identified by screening from those thin magnetic film cells which are in the initial or "0"-position. Thus in FIG. 3*a*, the cells 12, 17, 22, and 28 are screened. The magnetization condition represented in FIG. 3*a* has been preceded by a resetting of the B-cells into the zero position: this is achieved by a negative current pulse on the driving conductor B at instant $t_1$. Between the thin magnetic film cells which are in the "1"-position and those in the "0"-position domain walls appear which separate neighboring areas with opposed magnetization directions. The domain walls are all designated by 10.

At the instant $t_2$, a shift pulse acts on the A-cells, whereby the A-cells 13, 18 in the first shift register and the A-cells 23, 24, 15, 25, 26, and 29 in the second shift register are switched into the "1"-position. Whereas domain walls usually only propagate across one cell (e.g. the domain wall located between cells 12 and 13 (see FIG. 3*a*) moves one cell further to the right and is located between cells 13 and 14 (see FIG. 3*b*) at the end of the clock time $t_2$), the domain walls located at the crossing propagate across at least three cells. In the case involved here the domain wall between cells 22 and 23 (see FIG. 3*a*) propagates across five cells, that is, through the A-cell 23, the A-input element 24, the center element 15, the A-output element 25 and the A-cell 26 and at the end of clock time $t_2$ is located between cells 26 and 27 (see FIG. 3*b*). During the clock time $t_2$ it is assumed that a "1" is fed to the second shift register from the left so that the A-cell 20 also switches into the "1"-position. It is obviously possible to provide the thin magnetic film cell arrangement continued to the left and right by further cells in the customary shift register manner. The magnetization condition resulting at the end of clock time $t_2$ is shown diagrammatically in FIG. 3*b*.

At the instant $t_3$, a reset pulse acts on the C-cells, whereby the C-cells 12, 17 in the first shift register and the C-cells 22, 28 in the second shift register are reset into the "0"-position. At the instant $t_3$, the reset conductor R is supplied simultaneously with a negative pulse which acts on the center element 15, the input element 24 and the output element 25 as a reset pulse and brings about a reset of these cells into the initial position because of the domain walls which were previously (see FIG. 3*b*) between center element 15 and the neighboring cells 14 and 16. These domain walls propagate during the clock time $t_3$ across cells 15, 24, and 25, so that at the end of this clock time they lie between cells 23/24 and 25/26, respectively (see FIG. 3c). Thus before the commencement of clock time $t_4$ the center element 15 as well as the immediately neighboring cells 14, 16, 24, 25 are located in their initial position.

At the instant $t_4$, the driving conductor B is supplied with a positive pulse, i.e. a shift pulse which switches the B-cells to the "1"-position.

In detail, the input element 14, the center element 15, the output element 16 and the B-cell 19 are switched into the "1"-position in the first shift register. As mentioned previously, it is assumed that during the clock time $t_4$ a "1" is supplied to the first shift register from the left, so that the B-cell 11 also switches into the "1"-position. The B-cells 21 and 27 are switched into the "1"-position in the second shift register. The magnetization condition of the cells prevailing at the end of clock time $t_4$ is illustrated diagrammatically in FIG. 3d.

At the instant $t_5$, a reset pulse acts on the A-cells, whereby in the first shift register the cells 13 and 18, and in the second shift register the cells 20, 23, 26, and 29 are reset into their initial position. Since the center element 15 also belongs to the A-clock group, it is also reset to "0" during the clock time $t_4$. The A-reset pulse also acts on the input element 24 and on the output element 25; this, however, has no further significance since these cells are in any case already in the "0"-position to which, as described previously, they were already reset by the R-reset pulse during the clock time $t_3$. The magnetization condition prevailing at the end of clock time $t_5$ is shown diagrammatically in FIG. 3e.

At the instant $t_6$, a shift pulse acts on the C-cells, whereby in the first shift register the C-cells 12, 17, and in the second shift register the C-cells 22, 28 are switched into the "1"-position. With this shift operation the crossing is not further affected. The magnetization condition prevailing at the end of clock time $t_6$ is shown diagrammatically in FIG. 3f.

At the instant $t_7$, a reset pulse acts on the B-cells, whereby in the first shift register the cells 11, 14, 16 and in the second shift register the cells 21, 27 are reset to their initial position. Actually, the B-reset pulse also acts with respect to the center element 15, which, however, has been reset in its initial position the A-reset pulse occurring at instant $t_5$. The magnetization condition prevailing at the end of clock time $t_7$ is analogous to the magnetization condition at the end of clock time $t_1$, so that the present condition corresponds to the representation in FIG. 3a. The difference is that in the first shift register the "1" previously contained in C-cell 12 (at the end of $t_1$) appears in C-cell 17 after one clock period T (at the end of $t_7$), and that in the second shift register the "1" previously contained in the C-cell 22 (at the end of $t_1$) appears in C-cell 28 after one clock period T (at the end of $t_7$). Thus the transfer of said binary information which is independent one from the other takes place without mutual disturbance during a clock period T.

The timely performance of the transfer over the crossing of other binary information, e.g. "1" and "0," or "0" and "1," or "0" and "0" in both shift registers is similar to that just described. Therefore, a detailed representation is not deemed to be necessary.

Although one period T of the present clock program (see FIG. 2) comprises six individual clock times, it is nevertheless customary to speak of a three-clock system, since three cells (A, B, C )have to be provided for the representation of a binary digit within such a shift register.

The three-clock system herein described is conducive to the design of coplanar thin magnetic film arrangements up to three crossing rows of continuously connected, ring-shaped thin magnetic film cells. In this case the three input elements connected at the input side to the center element belong to the three different clock groups A, B, and C, aand so do the output elements connected at the output side to the center element. To each of the three output elements is connected yet a further thin magnetic film cell which belongs to the same clock group as the output element concerned. Before the application of every shift pulse, it is necessary for the center element and the connected input and output elements to be reset in their initial position. For this purpose, the reset conductors supplied with appropriate reset pulses are provided. Before an A-shift pulse, the A and C-input and output elements, before a B-shift pulse the A and B-input and output elements, and before a C-shift pulse the B and C-input and output elements must be reset into their initial position with the aid of the reset conductors provided in addition to the driving conductors. The center element belongs to all three clock groups A, B, and C.

Reference is now made to FIG. 4 which shows a coplanar thin magnetic film arrangement with two crossing rows of continuously connected thin magnetic film cells, operated in a four-clock system. As in the arrangement of the three-clock system described above, the thin magnetic film cells have a circular uniaxial anisotropy and also the initial positions characterizing definite information (e.g. "0") for the magnetization of the cells is defined in the same way. This initial condition is represented diagrammatically in FIG. 4 by the dotted arrows which indicate the direction of magnetization in the cells. As in the previous embodiment this arrangement also achieves the disturbance-free transfer over a coplanar crossing of independent binary information transferred along two shift registers. The first shift register comprises the thin magnetic film cells 31 to 39 and the second shift register the cells 40 to 49, whereby the center element 35 is common to both shift registers. As is known, four cells (A, B, C, D) are needed in a four-clock system to represent a binary digit in a shift register; however, only two driving conductors are necessary. For generating the magnetic driving fields, the two driving conductors I and II are provided which traverse in a meandering manner, i.e. alternately from top to bottom and from bottom to top the thin magnetic film cells allotted to them. The A-cells 33, 39, 43, 44, 45, 46, the C-cells 31, 37, 41, 48 and the center element 35 are associated with the driving conductor I; the B-cells 34, 36, 40, 47, the D-cells 32, 38, 42, 49 and also the center element 35 are associated with the driving conductor II. The driving conductor I traverses the cells 33, 39, 43, 35, 46 from top to bottom (symbolic sign ⊗ with an added I) and the cells 31, 37, 41, 44, 45, 48 from bottom to top (symbolic sign ⊙ with an added I). The driving conductor II traverses the cells 32, 35, 38, 42, 49 from top to bottom (symbolic sign ⊗ with an added II) and the cells 34, 36, 40, 47 from bottom to top (symbolic sign ⊙ with an added II). Thus with respect to the A-cells and the center element a positive pulse in the driving conductor I acts as a shift pulse, but with respect to the C-cells as a reset pulse. A negative pulse in the driving conductor I acts as a reset pulse with respect to the A-cells and the center element, but as a shift pulse with respect to the C-cells. A negative pulse in the driving conductor II acts as a reset pulse with respect to the B-cells and the center element, but as a shift pulse with respect to the D-cells. A positive pulse in the driving conductor II acts as a shift pulse with respect to the B-cells and the center element, but as a reset pulse with respect to the D-cells.

On the assumption that the information is transferred from left to right in the two shift registers, in the manner resulting from the clock program illustrated in FIG. 5 the binary information transmitted in the first shift register is fed to the input side of center element 35 via cell 34 (B-input element) and is taken away from the output side via cell 36 (B-output element); the binary information transmitted in the second shift register is fed to the input side of center element 35 via cell 44 (A-input element) and taken away on the output side via cell 45 (A-output element). Apart from the two previously mentioned driving conductors, the coplanar thin magnetic film arrangement in accordance with the invention comprises a reset conductor R, which is associated with the center element 35 and the neighboring A-input and A-output elements 44 and 45 which are part of the second shift register. The reset conductor R traverses the A-input element 44 from bottom to top, the neighboring center element 35 from top to bottom and the A-output element 45 connected on the output side from bottom to top again. This conductor arrangement is also indicated in FIG. 4 by the symbolical signs ⊙ and ⊗, coinciding with the above definition, with an added R. A negative pulse in the reset conductor R acts as a reset pulse on the allotted cells 44, 35, and 45.

The arrangement of thin magnetic film cells adopted in FIG. 4 is compatible with the meander-shaped weaving of the reset and driving conductors through the cells, i.e. in each case the next cell allotted to the common conductor is traversed in the opposite direction. In order to meet this requirement cell 43 is visualized in particular; it would be possible to dispense with the latter, but then it would be necessary to lead back one or possibly several driving conductors outside the actual configuration of thin magnetic film cells, from bottom to top or from top to bottom.

The pulse program represented in FIG. 5 is applied for operating the present coplanar four-clock thin magnetic film arrangement. The driving conductor I receives positive current pulses at the clock times $t=1, 6, 11$, etc., and negative current pulses at the clock times $t=4, 9, 14$, etc. The driving conductor II receives positive current pulses at the clock times $t=3, 8, 13$, etc., and negative current pulses at clock times $t=5, 10, 15$, etc.

The reset conductor R is supplied with negative current pulses (reset pulses) at the clock times $t=2, 7, 12$, etc.; the conductor does not receive any positive current pulses, i.e. shift pulses. In a practical embodiment it is necessary to imagine the driving conductors I and II as well as the reset conductor R connected to a clock pulse generator (not shown in FIG. 4) which supplies the positive and negative current pulses according to the clock program illustrated in FIG. 5. The current pulses are repeated periodically after five clock times; the clock period T is indicated in FIG. 5.

Figure 6A:
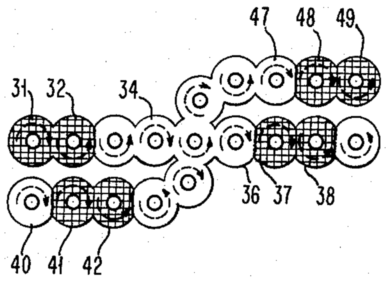

Reference is now made to the FIGS. 6*a* to 6*e* which show diagrammatically the time sequential action of an undisturbed transfer of binary information in the coplanar four-clock thin magnetic film arrangement of FIG. 4. In FIG. 6*a* it is assumed that the magnetization condition of cells 31, 32; 37, 38; 41, 42 and 48, 49 is opposed to the initial position. Thus, according to definition the cells are in the "1"-position (represented by screening). Since, as is known, one binary digit in a four-clock shift register is generally represented by a couple of cells, the above-mentioned cells, which are in pairs in the "1"-position, represent four binary digits "1." Between the thin magnetic film cells which are in the "1"-position and those which are in the "0"-position there are domain walls which separate areas of opposite magnetization directions.

Figure 6B:
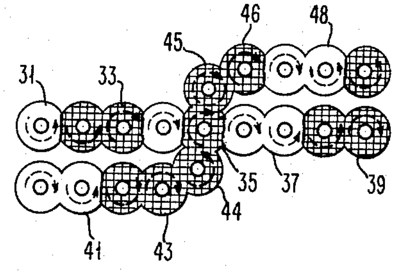

At the instant $t_1$, the driving conductor I is supplied with a positive current pulse. This effects a shift of the "1" into the A-cells 33 and 39 of the first shift register and into the A-cells 43, 44, 35, 45 and 46 of the second shift register. Simultaneously, the C-cells 31 and 37 of the first shift register and the C-cells 41 and 48 of the second shift register are reset to the "0"-position. The domain walls have propagated to the right correspondingly. The condition of magnetization prevailing at the end of clock time $t_1$ is shown in FIG. 6*b*.

Figure 6C:
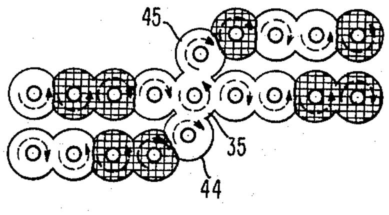

At the instant $t_2$, a negative current pulse is supplied to the reset conductor R which brings about a reset of the center element 35 and the neighboring A-input and A-output elements 44 and 45 into the "0"-position. The resulting magnetization condition is shown in FIG. 6*c*. As will be recognized the center element and the neighboring input and output elements are all in their initial or "0"-position, i.e. the coplanar crossing is in a condition which enables a binary value in the first shift register to be shifted over said crossing during the next clock time without being disturbed by the information present in the second shift register.

Figure 6D:
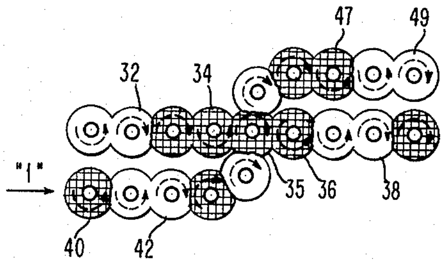

At the instant $t_3$, a positive current pulse supplied to driving conductor II effects a shift of the "1" into the B-cells 34, 35, and 36 of the first shift register and into the B-cells 40 and 47 of the second shift register. It is assumed here that a "1" is conveyed to the second shift register from the left as indicated schematically by the "1"-arrow. Simultaneously, the positive current pulse effects a reset of the D-cells 32 and 38 of the first shift register and also the D-cells 42 and 49 of the second shift register into the "0"-position. The magnetization condition resulting at the end of clock time $t_3$ is represented in FIG. 6*d*.

Figure 6E:
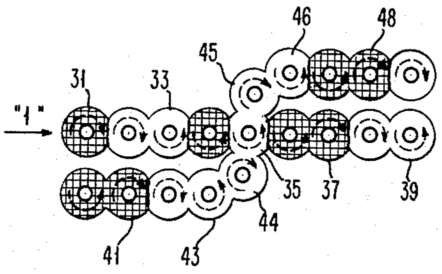

At the instant $t_4$, a shift pulse acts on the C-cells and a reset pulse on the A-cells. As a result, the C-cells 31 and 37 of the first shift register and the C-cells 41 and 48 of the second shift register are switched into the "1"-position. In this case as in the foregoing, it is assumed that a "1" is conveyed to the first shift register from the left, as indicated diagrammatically by a "1"-arrow. Simultaneously, the A-cells 33 and 39 of the first shift register, the A-cells 43 and 46 of the second shift register, and also the center element 35 are reset into the "0"-position. This reset pulse naturally also acts on the A-cells 44 and 45 but has no significance on them since they are already in the "0"-position due to the R-reset pulse which was effective at the instant $t_2$. The magnetization condition now present is shown in FIG. 6*e*.

At the instant $t_5$, a negative pulse in the driving conductor II causes shift pulses acting on the D-cells and reset pulses with respect to the B-cells, whereby the D-cells 32, 38, 42, and 49 are switched to "1" and the B-cells 34, 36, 40, and 47 reset to "0." The magnetization condition of the cells prevailing at the end of clock time $t_5$ is analogous to the magnetization condition assumed before the commencement of clock time $t_1$, so that the condition corresponds to the representation in FIG. 6*a*, with the sole difference that the binary information has been transferred correspondingly to the right after a clock period T has been completed.

Figure 7A:
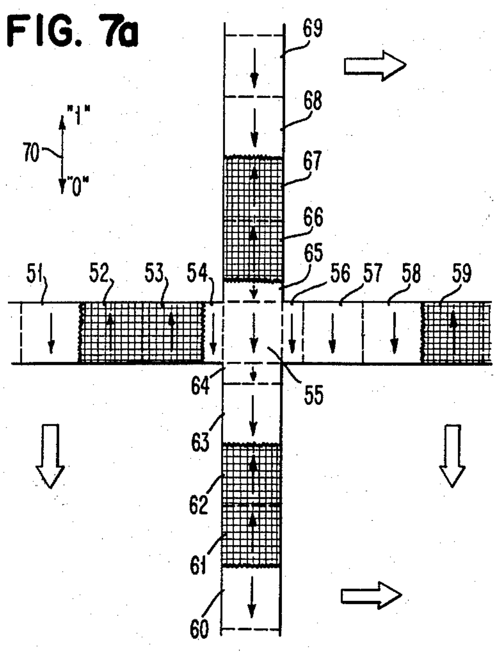
Figure 7B:
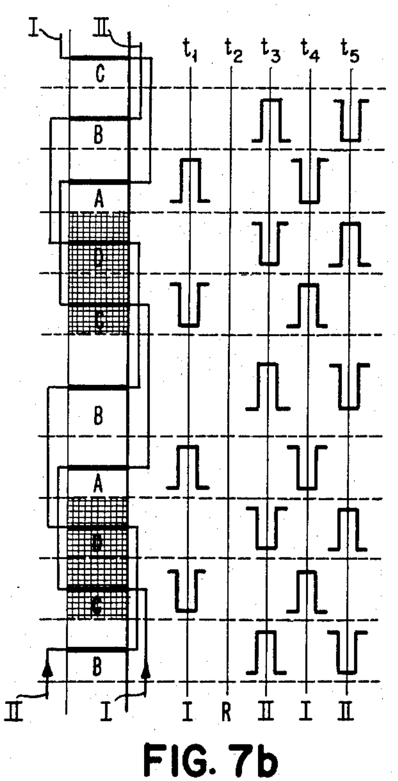
Figure 7C:
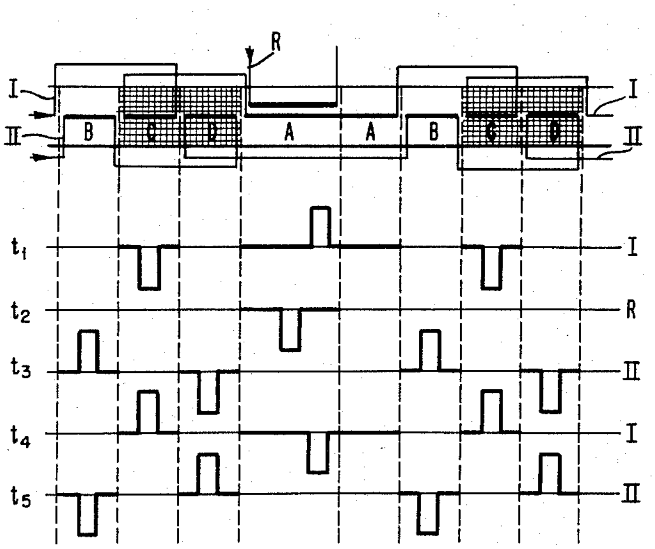

Finally, FIGS. 7*a* to 7*c* show a coplanar thin magnetic film arrangement operated in a four-clock system with two crossing thin magnetic film strips, whereby thin magnetic film cells with linear uniaxial anisotropy are employed. Arrangements wherein binary information is advanced along a single row of thin magnetic film cells in shift register fashion are known and have, for example, been described in an article by K. D. Broadbent and F. J. McClung, "A Thin Magnetic Film Shift Register" in 1960 International Solid-State Circuits Conference, Digest of Technical Papers, published by L. Winner, New York, February 1960, pp. 24–25.

In each of the crossing thin magnetic film strips (see FIG. 7*a*) independent binary information is transmitted in the manner of a shift register, without any mutually disturbing influence. The thin magnetic film strip forming the first shift register comprises the cells 51 to 59; the thin magnetic film strip forming the second shift register comprises the cells 60 to 69. The center element 55 is common to both shift registers. The thin magnetic film cells are defined by the position of the driving conductors. For the sake of clarity, the two thin magnetic film strips with the associated driving conductors are drawn separately in FIGS. 7*b* and 7*c*. The direction of uniaxial anisotropy (easy direction) 70 runs in the cells of the first shift register orthogonally to the longitudinal axis of the thin magnetic film strip and in the cells of the second shift register parallel to the longitudinal axis. It is assumed that the "1"-position is represented by an upwards and the "0" or initial position by a downwards oriented magnetization of the cells (see double arrow 70). Between cells with opposed information content domain walls are present which separate the areas with differently aligned directions of magnetization. For better understanding, the cells which contain a "1" are screened.

In the four clock system involved here, the thin magnetic film cells are allotted to the four clock groups A, B, C, and D. In detail: The cells 54, 55, 56, 57, 63, and 68 belong to clock group A, the cells 51, 58, 60, 64, 55, 65, and and 69 belong to clock group B, the cells 52, 59, 61, and 66 belong to clock group C and finally the cells 53, 62, and 67 belong to clock group D. It is evident that additional cells can be added, to the right, left, top, and bottom, as indicated in FIG. 7*a*. It is assumed that the binary information "1" is present in all C/D-cell couples.

The driving conductors I are allotted to the clock groups A and C, the driving conductors II are allotted to the clock groups B and D. The driving conductors which are in cooperation with the cells have to be considered in the form of strip lines (as it is known to one skilled in the art) which cover the cells in their entire width and length. For the sake of simplicity the driving conductors are depicted schematically as single lines in FIGS. 7*b*/*c*. In FIG. 7*c*, one should imagine that the conductors drawn in thin lines have to be turned upward so as not to cause any disturbing magnetic fields with respect to the cells. A positive current pulse (identical with the arrow direction in the drawing) in driving conductors I generates an upward-directed magnetic driving field (shift pulse) with respect to the A-cells and a downward-directed magnetic driving field (reset pulse) with respect to the C-cells; compare in this regard the pulse-shaped driving fields at the instant $t_1$ shown in FIGS. 7*b*/*c*. A positive current pulse (identical with the arrow direction in the drawing) in driving conductors II generates an upward-directed magnetic driving field (shift pulse) with respect to the B-cells and a downward-directed magnetic driving field (reset pulse) with respect to the D-cells; compare in this regard the pulse-shaped driving fields at the instant $t_3$ shown in FIGS. 7*b*/*c*. A negative current pulse in driving conductors I acts on the A-cells as a reset pulse, but on the C-cells as a shift pulse; compare in this regard the pulse-shaped driving fields at instant $t_4$ shown in FIGS. 7*b*/*c*. A negative current pulse in driving conductors II acts on the B-cells as a reset pulse, but on the D-cells as a shift pulse; compare in this regard the pulse-shaped driving fields at instant $t_5$ shown in FIGS. 7*b*/*c*.

Apart from the driving conductors I and II, there is further provided a reset conductor R which is acting on the center element 55 and the input and output elements 54 and 56 connected to it on the input and output sides, which all belong to the A-clock group. At the clock time $t_2$ the reset conductor is supplied with a negative current pulse (current direction opposed to the drawn arrow direction) which acts as a reset pulse with respect to cells 54, 55, and 56 and resets these cells to the "0"-position; compare in this regard the downward-directed pulse-shaped reset field at the instant $t_2$ shown in FIG. 7*c*. It is evident from the foregoing that for operating the coplanar thin magnetic film arrangement of FIGS. 7*a*/*b*/*c* the pulse program already described with reference to FIG. 5 will be employed.

The input and output elements 54, 56, 64, and 65 neighboring center element 55 can, if occasion arises, be kept smaller in their linear extension in the direction of the strip than the remaining cells. This linear extension need only be of such magnitude that a domain wall in one of these elements located in the marginal zone remote from the center element remains uninfluenced by a magnetic driving field acting on the center element but which does not act with respect to the input or output element containing the domain wall.

The time sequential action of an information transfer over the crossing in the subject embodiment takes place as follows: The state of magnetization of the cells assumed in FIG. 7*a* is adopted here, i.e. the cells 52, 53, 59, 61, 62, 66, and 67 are in the "1"-position and the cells 51, 54, 55, 56, 57, 58, 60, 63, 64, 65, 68 and 69 are in the "0"-position. At the conclusion of the individual clock times the following changes have taken place in the magnetization state of the cells (cells which remain unaltered during a clock time will not be mentioned specifically).

The positive current pulse in driving conductors I at clock time $t_1$ causes the A-cells 54, 55, 56, 57, 63, and 68 to be switched into the "1"-position at the end of this clock-time and the C-cells 52, 59, 61, and 66 to be reset into the "0"-position.

The R-reset pulse at clock time $t_2$ causes the center element 55 and the neighboring A-input and A-output elements 54 and 56 to be reset into the "0"-position at the end of this clock time.

The positive current pulse in the driving conductors II at clock time $t_3$ causes the B-cells 58, 64, 55, 65, and 69 to be in the "1"-position at the end of this clock time and the D cells 53, 62, and 67 to be in the "0"-position.

The negative current pulse in the driving conductors I at clock time $t_4$ causes the C-cells 59, 66 and the C-cell neighboring the top of cell 69 to be switched into the "1"-position at the end of this clock time, and the A-cells 55, 57, 63, and 68 to be reset into the "0"-position. This negative current pulse naturally also acts as a reset pulse with respect to the A-cells 54 and 56, but is not significant for these cells were previously reset to the "0"-position by the R-set pulse which was active at the instant $t_2$.

The negative current pulse in driving conductors II at clock time $t_5$ causes the D-cell neighboring on the right of cell 59 and also the D-cell 67 to be in the "1"-position and the B-cells 58, 64, 65, and 69 to be in the "0"-position at the end of this clock time. This negative current pulse also acts as a reset pulse with respect to the center element 55 but is nevertheless insignificant since it was previously reset to the "0"-position by the A-reset pulse at the instant $t_4$.

This concludes one clock period and the clock sequence recommences (compare the clock program shown in FIG. 5). It was assumed in the foregoing time sequential action of information transfer that binary values "0" are fed to the two shift registers from the left or bottom, respectively, at the clock time $t_3$, so that at the end of $t_5$ the cells 52, 53, 61, and 62 are in the "0"-position.

Although the basic and new features of the coplanar arrangement of thin magnetic film cells in accordance with this invention, applied to embodiments in three-clock and four-clock systems and with circular uniaxial and linear uniaxial thin magnetic film cells, have been shown and described, it will be understood by those skilled in the art that various changes in form and details may be made therein without departing from the spirit and scope of the invention.

What is claimed is:

1. A magnetic switching arrangement comprising a magnetic medium defining a plurality of groups of magnetizable zones each having a uniaxial anisotropic characteristic, each of said groups being arranged in contiguous fashion so as to support domain wall propagation, a domain wall being established between adjacent ones of said zones having different remanent flux states, said medium further defining a transfer zone and a number of intermediate zones having similar characteristics, said intermediate zones connecting said transfer zone in contiguous fashion to each of said groups, means for applying to predetermined zones in each of said groups a coercive force larger than the critical field strength necessary to alter the remanent flux state in said predetermined zone when a next preceding zone is in an altered state so as to effect domain wall propagation toward said transfer zone in particular ones of said groups and away from said transfer zone in others of said groups, said coercive means including further means for concurrently applying a coercive force to said transfer zone and said intermediate zones contiguous with one of said particular groups and one of said other groups, and means for subsequently applying a normalizing coercive force to said transfer zone and said intermediate zones subsequent to the operation of said coercive means in applying a coercive force to a first zone in said one other group contiguous with said intermediate zone whereby a domain wall is propagated across said transfer zone and said intermediate zones.

2. A magnetic switching arrangement comprising a continuous magnetic medium defining a plurality of groups of magnetizable cells having uniaxial anisotropic characteristics, each of said groups being arranged in contiguous fashion so as to support domain wall propagation and being continuous at a discrete common portion of said medium defining a coplanar crossing, first means for applying a coercive force to predetermined ones of said cells in said groups so as to propagate domain walls along particular ones of said groups to said common portion and along others of said groups from said common portion, and second means for controlling said common portion so as to propagate domain walls propagated thereto along a selected one of said other groups.

3. A magnetic switching arrangement as set forth in claim 2 wherein each of said magnetizable cells and said common portion are ring shaped and have circular, uniaxial anisotropic characteristics.

4. A magnetic switching arrangement as set forth in claim 2 wherein each of said magnetizable cells and said common portion have a linear, uniaxial anisotropic characteristic, the said characteristics of said magnetizable cells in each of said groups being aligned with the said characteristic of said common portion.

5. A switching arrangement as set forth in claim 2 wherein said first means includes means for subjecting each of said groups to a same shift and reset clock program, particular ones of said cells in each of said groups being allotted to a same clock group.

6. A switching arrangement comprising a continuous magnetic medium defining discrete magnetizable areas each having uniaxial anisotropic characteristics and arranged in at least two continuous rows so as to support domain wall propagation therealong, domain walls being established between adjacent areas in each of said rows having different remanent flux states, means for applying a coercive force to predetermined ones of said magnetizable areas in turn, said coercive force being sufficient to propagate said domain walls along said predetermined ones of said magnetizable areas but insufficient to nucleate domain walls, a transfer area common to each of said rows so as to define a cross over point on the plane of said magnetic medium, said coercive means being operative so as to cause domain wall propagation along each of said rows to be alternately directed to and propagated across said common transfer area.

7. A switching arrangement as set forth in claim 6 wherein said common transfer area defines a central magnetizable area and a number of intermediate magnetizable areas for interconnecting said central area in each of said rows, respectively, said coercive means being operative to apply coercive force concurrently to said central area and to particular ones of said intermediate areas in time sequence whereby a domain wall is propagated along said common transfer area and along one of said rows at any one time, said intermediate areas interconnecting said central area in the other of said rows being such that the domain wall state in the other of said rows is not disturbed.

8. A switching arrangement comprising a continuous thin magnetic film having uniaxial anisotropic characteristics and defining at least two rows of contiguous magnetizable areas, a common area of said magnetic film defining a cross over point interconnecting sections of each of said rows so as to be continuous therewith and support domain wall propagation therebetween, first means coupled to each of said sections for applying a coercive force to predetermined ones of said areas in each of said rows, and coercive force being larger than that critical field strength necessary to alter the state of flux in said predetermined areas when a next preceding one of said areas in said rows is in an altered flux state so as to effect domain wall propagation therealong, said coercive means being operative to advance said domain walls along each of said rows so as to be alternately directed in time sequence to said common area and being further operative to concurrently apply a coercive force to said common area whereby said domain wall is transferred along said common area and between sections of a same row, and second means for applying a normalizing coercive force to said common area.

9. A switching arrangement comprising a continuous thin magnetic film having uniaxial characteristics and defining at least two rows of discrete magnetizable areas each pervious to domain wall propagation, sections of each of said rows being interconnected and continuous along a discrete common area of said film whereby domain wall propagation is supported therebetween, a domain wall being established between adjacent areas having different remanent states of flux orientation, first means coupled to said magnetic film for applying a coercive force to predetermined ones of said discrete areas in each of said rows in particular sequence so as to effect domain wall propagation therealong, said first means being further operative to apply a coercive force to said common area and alternately to said magnetizable areas adjacent therewith in sections of each of said rows so as to alternately support domain wall propagation between sections of each of said rows, and second means for applying a normalizing coercive force to said common area.

10. A switching arrangement as set forth in claim 9 wherein said first means is operative to concurrently apply a coercive force to at least a pair of magnetizable areas adjacent to said common area in sections of one of said rows and wherein said second means is operative to concurrently apply a normalizing coercive force to the nearest adjacent one of said magnetizable areas in said sections of said one row and said common area.

11. A switching arrangement as set forth in claim 9 wherein said first means is operative to apply a coercive force to said common area and adjacent magnetizable areas in sections of one of said rows along which a domain wall is to be propagated and wherein said second means in operative to apply a normalizing coercive force to said common area and said adjacent magnetizable areas.

12. A switching arrangement comprising a continuous magnetic thin film defining a plurality of contiguous magnetizable areas arranged in at least two distinct rows so as to be pervious to domain wall propagation, one of said magnetizable areas being common to each of said rows, means for applying coercive force to predetermined ones of said magnetizable areas on a specific group basis so as to advance domain walls along each of said respective rows, said magnetizable areas continuous with said common area along each of said rows being allotted to a different specific group and said common element being allotted to each of said groups such that said common area supports domain wall propagation along each of said rows in turn.

13. A switching arrangement as set forth in claim 12 wherein a predetermined number of said magnetizable areas adjacent to said common area along each of said rows are allotted to a same specific group, the number of said adjacent magnetizable areas thus allotted in each of said rows being different.

14. A switching arrangement comprising a uniplanar member made of magnetic material defining a plurality of discrete magnetizable areas arranged in at least two rows so as to be pervious to domain wall propagation, domain walls being established between adjacent magnetizable areas having different flux states, and means including a plurality of driving conductors inductively coupled on a group basis to predetermined ones of said magnetizable areas in each of said rows for applying a coercive force to effect domain wall propagation along each of said rows, said coercive means being further operative to subsequently apply a normalizing coercive force to groups of magnetizable areas upon said domain walls having advanced along said rows, said rows including a common magnetizable area defining a uniplanar cross over point on the plane of said magnetic medium along which domain walls are propagated along each of said rows, said coercive means being operative such that domain walls propagated along each of said rows are directed to said common area in different time sequence so as not to disturb the domain wall state of said other row.

15. A switching arrangement as set forth in claim 14 wherein said magnetizable areas in each of said rows immediately adjacent to said common area are inductively coupled to a same driving conductor and said common area is inductively coupled to each of said driving conductors, and further including means for applying a normalizing coercive force to said common area.

References Cited by the Examiner

UNITED STATES PATENTS

| | | | |
|---|---|---|---|
| 2,919,432 | 12/59 | Broadbent | 340—174 |
| 3,068,453 | 12/62 | Broadbent | 340—174 |

IRVING L. SRAGOW, *Primary Examiner.*